J. R. SNYDER.
STEAM ENGINE REVERSING GEAR.
APPLICATION FILED SEPT. 18, 1916.
1,302,096.
Patented Apr. 29, 1919.
3 SHEETS—SHEET 1.
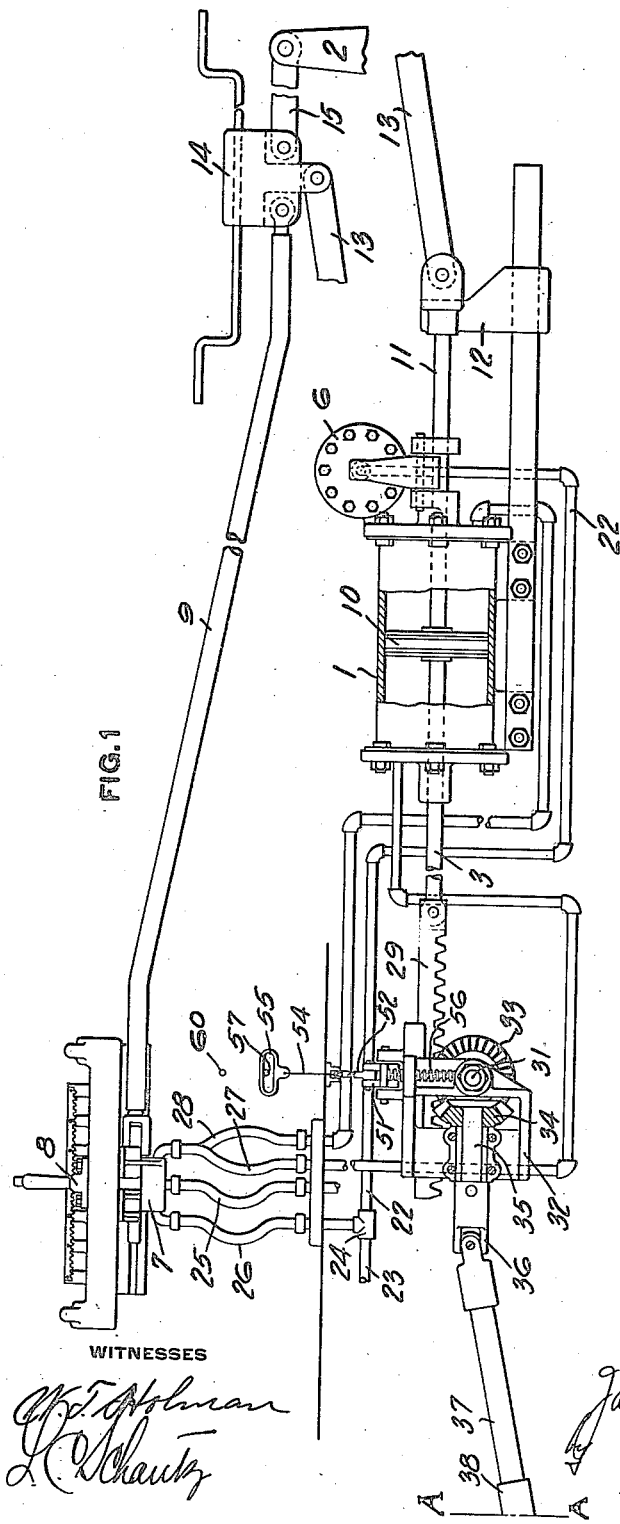
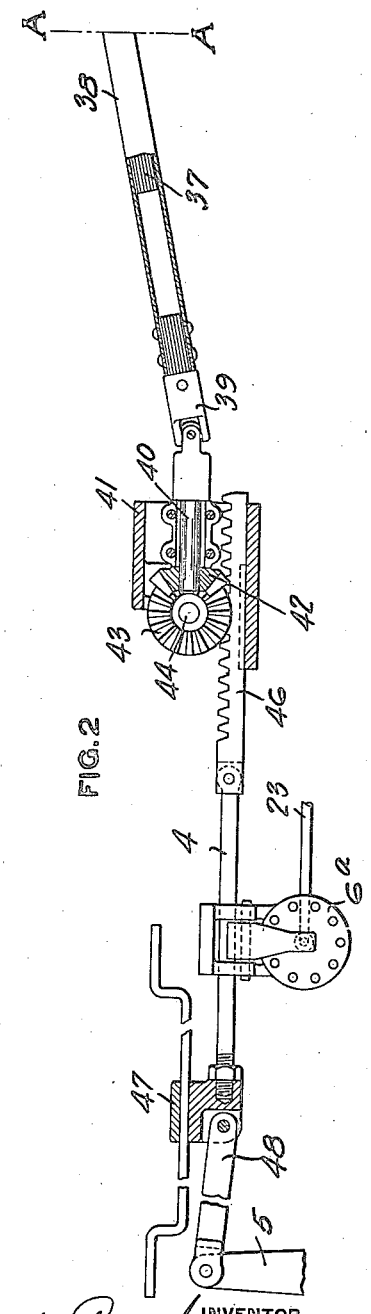

J. R. SNYDER.
STEAM ENGINE REVERSING GEAR.
APPLICATION FILED SEPT. 18, 1916.
1,302,096.
Patented Apr. 29, 1919.
3 SHEETS—SHEET 2.
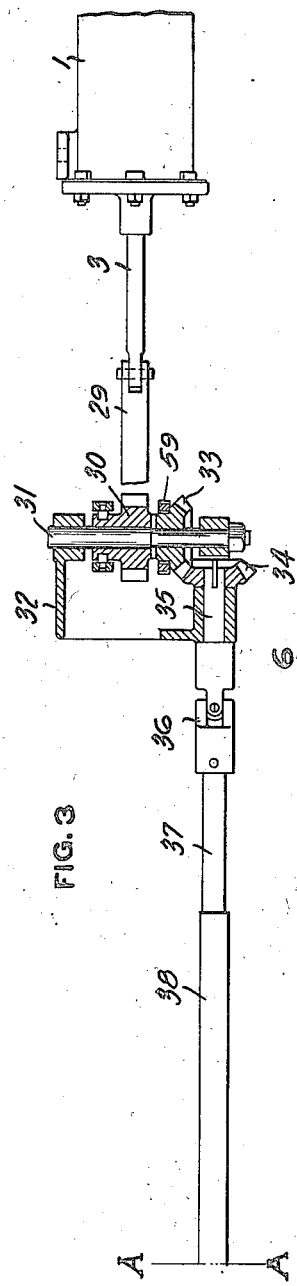
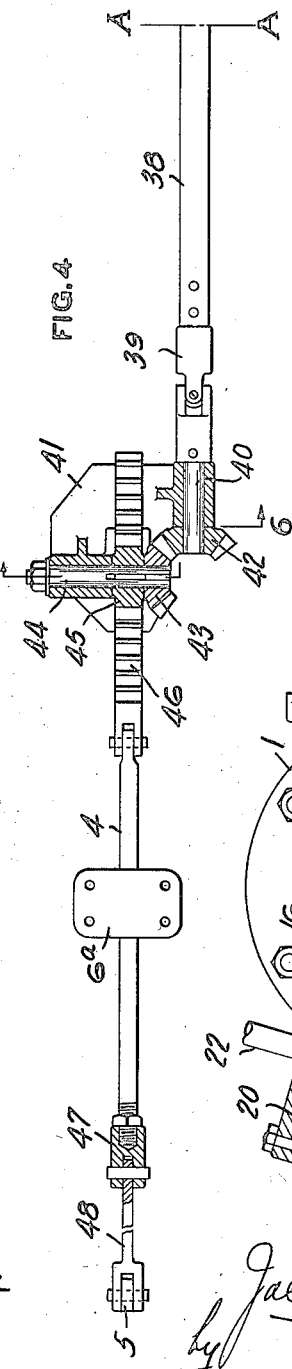
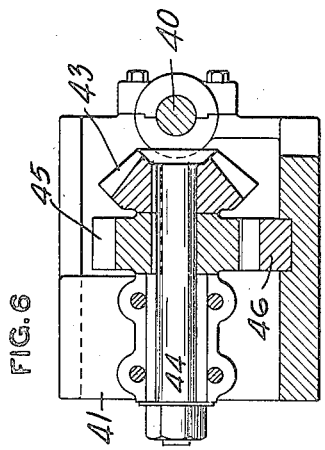
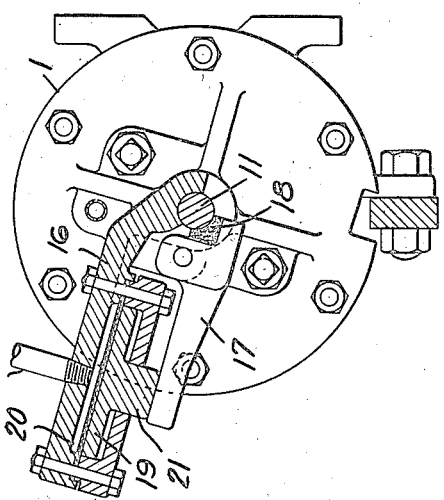

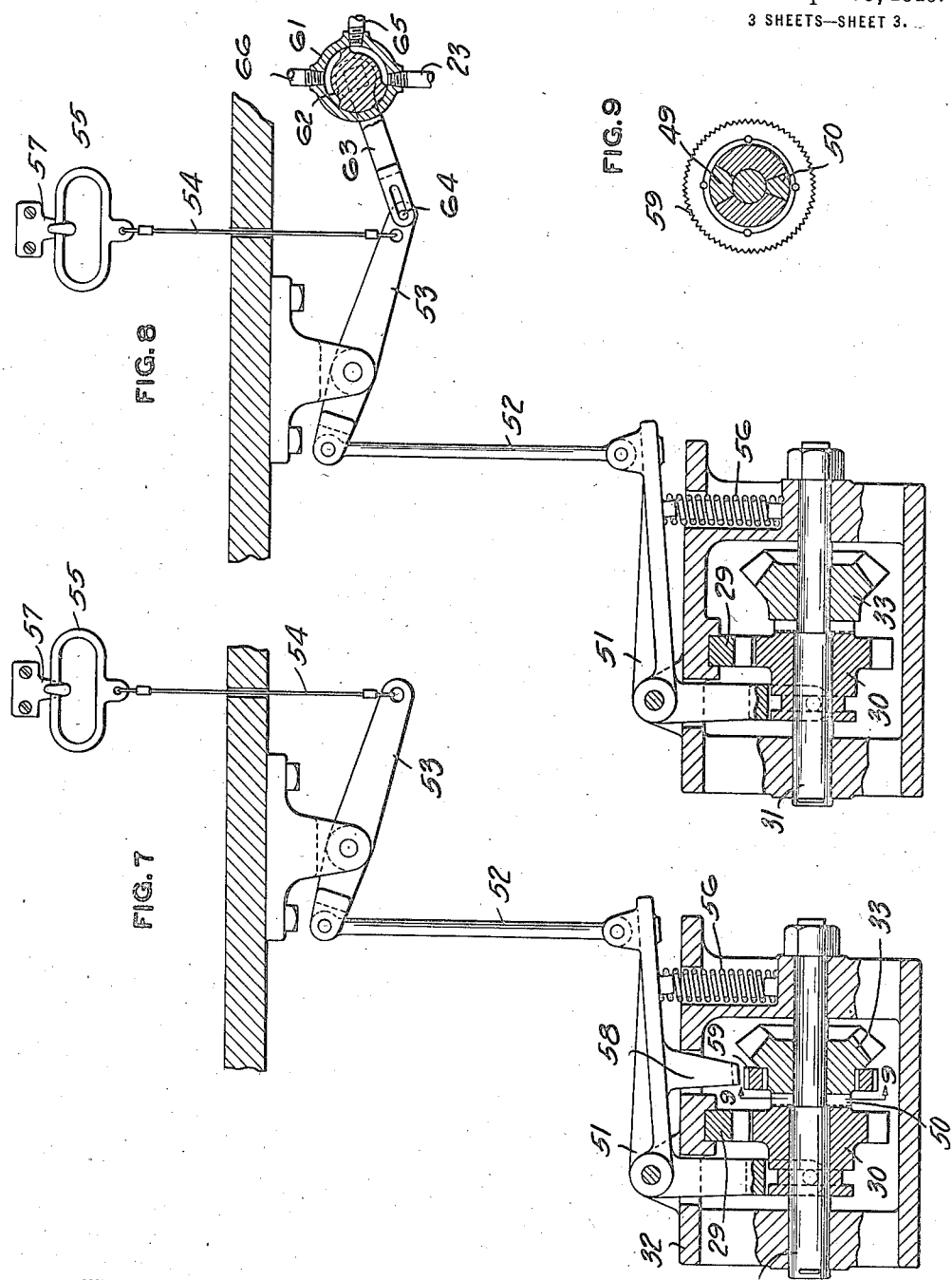

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

STEAM-ENGINE REVERSING-GEAR.

1,302,096.  Specification of Letters Patent.  Patented Apr. 29, 1919.

Application filed September 18, 1916. Serial No. 120,715.

*To all whom it may concern:*

Be it known that I, JACOB RUSH SNYDER, a resident of Pittsburgh, in the county of Allegheny and State of Pennsylvania, have invented a new and useful Improvement in Steam-Engine Reversing-Gears, of which the following is a specification.

This invention relates to valve reversing mechanism for steam engines and the like, and particularly for steam locomotives when used in conjunction with either a tender equipped as a tractor, or other auxiliary locomotive.

This invention comprises valve reversing mechanism by means of which the engineer from his proper and accustomed place in the cab of the locomotive proper can readily control the valves on both the locomotive and the tractor or auxiliary locomotive by a single control lever on the locomotive, so as to operate the locomotive and the tractor or auxiliary locomotive, synchronously, or together as a unit, or operate as may best suit the requirements of the conditions under which he may be running. It is, of course, to be understood that the invention is not limited in its application to the control of a locomotive and a tender provided with driving means, but may be otherwise applied to one or more locomotives.

The mechanism will be referred to as a valve reversing mechanism, which is the usual term applied to these mechanisms. The mechanism not only reverses the valve, but also by stopping the mechanism in any of its intermediate positions, the position of the valves may be adjusted to vary the cut-off or steam admission to the cylinders. It is to be understood that the mechanism referred to as valve reversing mechanism has both of these functions, such term being used because it is the usual term applied to these mechanisms by those skilled in the art.

One object of the invention is to provide a single mechanism controllable from the cab of a locomotive by which the engineer may easily control the operation of that locomotive and also its tractor or auxiliary power means so as to work them together or separately as desired.

Another object is to provide a valve control mechanism which is positively operated by a power motor which in turn is under the absolute control of the engineer from his accustomed place in the cab of the locomotive.

A further object is to provide a mechanism for locomotives of the character described, in which the valve mechanisms not only are operated positively by a power motor under the control of the engineer, but also are securely and automatically locked in their neutral or various working positions at the will of the engineer.

A further object is to provide a reversing and adjusting mechanism, of the characters described, by means of which the valve control mechanism on the auxiliary locomotive may be disconnected in any of its positions, from the valve mechanism of the other locomotive, and automatically locked in said position, the mechanism for securing this position being operable from the engineer's cab on one of the locomotives.

Another object is to provide valve control mechanism, of the character described, in which, when the valve mechanisms have been moved to the desired extent, the locomotive control mechanism is automatically moved to neutral position, locking the valve mechanisms in their respective positions and rendering the power motor inert.

Other objects and advantages of the invention will hereinafter appear.

The accompanying drawings illustrate an embodiment of the invention. The views of the drawings are as follows:—

Figure 1 is a side elevation and partial cross section of the valve control mechanism located on the main locomotive, the rod connecting this mechanism with the mechanism on the auxiliary locomotive or tractor being broken on the line A—A.

Fig. 2 is a continuation of Fig. 1, showing the mechanism located on the auxiliary locomotive, the rod at the right-hand side of the figure being a continuation of the rod at the left-hand side of Fig. 1.

Fig. 3 is a plan view and partial cross section of the mechanism on the main locomotive by means of which the reciprocatory motion of the power motor is transferred to rotary motion of a connecting means to the mechanism on the auxiliary locomotive, the connecting means being severed on the line A—A.

Fig. 4 is a continuation of Fig. 3, showing the mechanism on the auxiliary locomotive for converting the rotary motion of the connecting means between the two locomotives to reciprocatory motion.

Fig. 5 is an end view of the power cylinder, showing the power operated locking means in cross section.

Fig. 6 is a cross section of the gearing on the line 6—6 of Fig. 4.

Fig. 7 is a side elevation and cross section of the clutching mechanism by means of which the mechanism on the auxiliary locomotive is disconnected from the mechanism on the main locomotive and locked in position.

Fig. 8 is a side elevation and partial cross section with an alternate form of clutching mechanism in which the operating lever for the clutching mechanism controls the fluid pressure lock for locking the valve control mechanism on the auxiliary locomotive.

Fig. 9 is a cross section on the line 9—9, Fig. 7.

The mechanism as shown in Figs. 1 and 2 will first be described generally, after which the various elements thereof will be explained in detail.

The mechanism is power operated for which purpose a power motor 1 is provided for operating, through suitable connections, a tumbler bar 2 connected to the locomotive link valve mechanism, not shown. The motor also operates a rod 3, connected through suitable gearing and flexible and slidable connections to a rod 4 shown in Fig. 2, which in turn is connected to a tumbler bar 5 of the link valve mechanism (not shown) for the auxiliary locomotive, or tractor. The connection between the mechanism on the main and on the auxiliary locomotive includes a clutching mechanism by means of which the mechanisms may be disconnected from each other from a point in the engineer's cab, as will be hereinafter explained. A fluid pressure lock 6 is provided for locking the mechanism for the main locomotive, and a similar fluid pressure lock 6ª is provided for locking the mechanism for the auxiliary locomotive. The supply and exhaust of motive fluid to both of the locking means and to the fluid pressure motor is controlled by valve mechanism 7 arranged to be located on one of the locomotives and controlled by a single controlling means 8. The valve mechanism 7 is operatively connected by a rod 9, or other suitable connections, to the link 2 of the valve mechanism on the main locomotive so as to move synchronously therewith.

It will thus be seen that the valve controlling mechanism on the main locomotive and valve controlling mechanism on the auxiliary locomotive are both operated by a single fluid pressure motor; that both mechanisms are independently locked by fluid pressure locking means; that both the locking means and the fluid pressure motor are controlled from a single point; that, by means controllable from the same point, the valve mechanism on the auxiliary locomotive may be disconnected and locked in disconnected position when the driving power of the auxiliary locomotive is not required; and that the fluid pressure control means is connected to the valve control mechanism on the main locomotive in such a way as to move synchronously therewith for the purpose of automatically moving the fluid pressure control mechanism to neutral position when the engine link mechanism has moved to the required extent, as will be hereinafter explained.

The fluid pressure motor shown comprises a cylinder having a piston 10 therein connected by a piston rod 11 to a cross head 12 to which the connecting rod 13 is attached. The rod 13 is connected to a cross head 14 which in turn is connected by link 15 to the link 2 of the locomotive valve mechanism. When the valve mechanism on the locomotive is in neutral position, the piston 10 is stationed midway of the length of the cylinder, as shown in Fig. 1, and to drive the engine forwardly the cross head 12 and connecting rod 13 are moved to the right, viewed in Fig. 1, by admitting fluid pressure to the left-hand end of the cylinder and to reverse the engine the cross head 12 and connecting rod 13 are moved toward the left by admitting fluid pressure into the right-hand end of cylinder 1.

The locking means 6 comprises a member 16 engaging one side of the piston rod 11 and a pivoted clamping member 17 for gripping the opposite side of said rod, said clamping member being provided with a suitable gripping surface 18. The pivoted member 17 is actuated to grip the rod by means of a movable abutment 19 in a small power cylinder 20, said abutment carrying a projection 21 contacting with the outer end of the member 17. Fluid pressure can be admitted to and exhausted from the cylinder 20 through a pipe 22. When motive fluid is admitted to said cylinder, the movable abutment 19 actuates the member 17 to grip the rod 11 and thus positively lock the latter in position. This locking means firmly holds the piston rod in position, but it will be noted that it nevertheless is frictional and therefore permits the rod to be forcibly moved under abnormal conditions without the liability of breaking any of the parts, as would be the case with toothed and similar mechanical locks.

The fluid pressure locking means 6ª for locking the valve operating rod 4 on the auxiliary locomotive or tractor is similar to the lock 6 and therefore need not be described in detail. It is supplied with motive fluid through the pipe 23 which is connected with the pipe 22 at the point 24 shown in Fig. 1.

These fluid pressure locks have an additional advantage in that they prevent wear on the valve mechanisms and thereby prolong the life of the same. When the locomotives are running the tumbling bars 2 and 5 deliver hammer blows to the valve reversing mechanism at each stroke of the engine pistons. This blow when communicated to mechanical gearing, such as the gearing connecting the two valve reversing mechanisms, causes it to rapidly wear out. In the mechanism shown the fluid pressure operated locks which grip the rods connected to the tumbling bars 2 and 5 absorb these shocks and prevent them being transmitted to the mechanical elements. If the locks were mechanical locks they would themselves be rapidly worn out by the hammer blows from the tumbling bars, but by reason of the fact that they are friction locks the blows are absorbed without damage to either the lock or to the valve reversing mechanism. The construction therefore prevents the operating shocks and strains, which emanate from the locomotive valve mechanisms, from being transmitted to the valve reversing gear, and such shocks and strains are absorbed without damage to the means provided for absorbing them.

The valve 7 for controlling the admission and release of motive fluid to the fluid pressure locks and to the cylinder is preferably of the rotary type. The operation of this valve is controlled by a sliding controlling member 8 which is arranged to reciprocate in either direction from the neutral position shown in Fig. 1 and to thereby actuate the valve through camming connections with the rotary member of the valve. The details of the valve 7 and of the controlling means 8 and of the camming connections therebetween are fully disclosed in a co-pending application of Jacob Rush Snyder, Serial No. 115,074, filed August 15, 1916, and therefore will not be further described herein other than to state that when the valve is moved from neutral position, motive fluid is exhausted from the pipe 26 leading to the locking means and admitted to either the pipe 27 or the pipe 28 to the fluid pressure cylinder, depending upon in which direction the controlling member 8 is moved. When the valve is moved to neutral position, motive fluid is exhausted from both of the pipes 27 and 28 and admitted to the pipe 26 leading to the locking means. It is to be understood that other suitable valves having these functions may be used if described.

The whole valve mechanism is slidably mounted on the locomotive so that it may be moved bodily, the connection 25 to the source of supply, the connection 26 to the locks 6 and 6ª, and the connections 27 and 28 to the left and right-hand sides of the cylinder respectively being made flexible so as to permit bodily movement of the valve. The valve 7 is connected by means of the rod 9 to the cross head 14 which is connected to the tumbler bar 2 by the link 15. The valve 7 thus moves bodily in synchronism with the bar 2 of the locomotive link valve mechanism.

When it is desired to operate the reversing mechanism the controlling member 8 is moved in the desired direction from the neutral position, which movement actuates the valve 7 and exhausts motive fluid from both of the locking means and admits motive fluid to one end of the cylinder. The piston 10 then moves in the corresponding direction and actuates the link 2 which moves the valve 7 bodily with it until said valve reaches the position at which the controlling member 8 has been set, whereupon the camming connections between the controlling member 8 and the valve 7 automatically return the valve to neutral position, thereby exhausting motive fluid from both ends of the cylinder and admitting motive fluid to both locking means. The fluid pressure motor is thus automatically stopped when the locomotive valve mechanisms have moved to the desired extent and the fluid pressure locks are automatically applied.

As hereinbefore mentioned, the fluid pressure motor 1 is also arranged to operate the mechanism on the tractor or auxiliary locomotive. The construction by means of which this result is accomplished is as follows:—

Connected to the side of the piston opposite to that to which the rod 11 is connected is the rod 3 which is connected to a toothed rack 29. This rack operates a spur gear 30 rotatably mounted on a shaft 31 carried by a suitable frame 32 arranged to be mounted on the locomotive. The gear 30 is normally connected to a bevel gear 33 also journaled on shaft 31, said bevel gear coöperating with a second bevel gear 34 rigidly attached to the shaft 35 at an angle to the shaft 31. The gear 30 is held against longitudinal movement in one direction by engagement with the bevel gear 33 and in the opposite direction it is held against longitudinal movement by the shoulder on the shaft 31. The reciprocatory motion of the rack 29 is thus transferred to rotary motion, such motion of the connecting means between the locomotive and tractor being preferable to reciprocatory motion because of the continually varying distances between the locomotive and tractor under practical running conditions.

The shaft 35 is connected by means of a universal joint 36 to a polygonal rod 37 telescoping with a hollow complementary rod 38, the latter being connected by means of a universal joint 39 to a shaft 40 journaled in a suitable bearing member 41 mounted on the tractor. This construction provides a flexible and slidable connection which adjusts itself to the varying distances between the locomotive and tender due to the relative movement of the two in traveling around curves and when jerking and vibrating as is usual in practical operation. The universal joints permit angular motion between the locomotive and tractor and the telescopic connections permit reciprocatory motion between them. At the same time reciprocatory motion of the valve reversing mechanism on the locomotive is transmitted to reciprocatory motion of the valve reversing gear on the tractor, without loss of motion or variation of the relative positions of the two mechanisms because of variations in the relative positions of the locomotive and tractor. This result is attained by reason of the fact that the reciprocatory motion is first converted to rotary motion and transmitted from the locomotive to the tractor as such and then again converted to reciprocatory motion.

The shaft 40 on the tractor has a bevel gear 42 attached thereto meshing with a bevel gear 43 fixed to the shaft 44 which carries a spur gear 45 meshing with a rack 46. The rack 46 is connected to the valve controlling rod 4 on the tractor, said rod being connected by means of the cross head 47 and the link 48 to the tumbler bar 5 of the link valve mechanism on the tractor, not shown. The movements of the piston rod 3 of the fluid pressure cylinder are thus first transferred to rotary motion and then to reciprocatory motion to cause the rod 4 to reciprocate in the same direction as the rod 3. The connection between the parts is positive and at the same time allows sufficient play between the locomotive and tractor.
As it may be desirable, when hauling a train up grade, to use both the main locomotive and the tractor to their full capacity and then when going down grade to use only the locomotive, or at least to use the tractor at only a portion of its maximum capacity, it is important to have some means for cutting out the tractor when its driving power is not required. This means should be positive in its action and should lock the valve reversing mechanism of the tractor in the required position. It should also be easily operable and readily accessible from the locomotive cab without requiring the engineer to leave his seat in the cab or change his position. The mechanism provided for accomplishing this result is in the nature of a clutch mechanism shown in Fig. 7.

The spur gear 30 is slidable on the shaft 31 as well as rotatable thereon and one side of this gear is provided with two projections or teeth 49 and 50, the projection 49 being of greater width than the projection 50. These two projections register with complementary recesses in the bevel gear
33. By moving the gear 30 into and out of engagement with the gear 33, the valve reversing mechanism on the tractor is operatively connected and disconnected from the mechanism on the locomotive. The difference in size of the extensions 49 and 50 and their complementary recesses prevents the gears engaging except when in certain relative positions. The gear ratios are such that in the movement of the mechanisms the gear 30 does not make a complete revolution. By reason of this fact and by reason of the fact that the projections on gear 30 will engage on the recesses in gear 33 only when said gears are in a certain relative position, the valve reversing mechanism on the tractor is always connected to the valve reversing mechanism on the locomotive in the same relative positions of the two mechanisms.

For the purpose of moving the gear 30 into and out of engagement with the bevel gear 33, a bevel crank lever 51 is provided which is connected by means of a rod 52, a lever 53, and a wire rope or rod 54 with an operating handle or grip 55. The bell crank lever 51 is normally biased by means of the spring 56 to the position shown in Fig. 7 in which the gear 30 is in engagement with the gear 33 and the valve reversing mechanism on the tractor is normally connected to the mechanism on the main locomotive. The handle 55 for operating the clutch is preferably located in the engineer's cab in a position where he can conveniently grasp the same and is normally secured to a hook 57 fastened to the side of the cab or to the locomotive fire box.

When it is desired to disconnect the valve controlling mechanism on the tractor, the handle 55 is moved upwardly, which movement forces the rod 52 down and moves the bell crank 51 against the pressure of spring 56 to throw the gear 30 out of engagement with the gear 33. It is desirable, when the valve controlling mechanism of the tractor has been disconnected, to lock it in position, and for this purpose the bell crank lever 51 is provided with a projection 58 arranged to engage a toothed gear 59 carried by the bevel gear 33. As the bell crank 51 is moved to throw the gear 30 out of engagement with the gear 33, the projection 58 engages the gear 59 to thereby automatically lock the bevel gear 33 in position to prevent movement of the valve controlling mechanism on the tractor. In order to prevent the bell crank lever from being accidentally moved back to its normal position, the handle 55 is secured to a hook 60 shown in Fig. 1 after it has been raised to disconnect the gears. It is, of course, to be understood that the gear 30 may be thrown into and out of engagement with the gear 33 by other suitable means and that the structure shown may be operated by means of a foot lever or pivoted hand lever or other suitable mechanical devices.

An alternate form of locking means is shown in Fig. 8. In this form the gear 30 is moved into and out of engagement with the gear 33 by the bell crank lever 50 in the same manner as in the mechanism just described. The projection on the bell crank lever for engaging the bevel gear 33 to lock the same in position is omitted in this case, however, and the valve controlling mechanism on the tractor is locked in position by means of the fluid pressure lock 6ª illustrated in Fig. 2. To accomplish this result a three-way valve 61 is provided, the rotary member 62 of which is operated by a lever 63 connected by pin and slot connection 64 to the lever 53. The rotary member 62 in one of its positions connects pipe 65 with pipe 23 leading to the rotary valve 7. In another of its positions it connects the pipe 65 with a pipe 66 leading to the main source of fluid pressure supply.

When the gears 30 and 33 are in engagement, the valve controlling mechanism on the tractor then being connected to the valve mechanism on the locomotive, the mechanism is in the position shown in Fig. 8 and the pipe 65 leading to the lock 6ª is connected to the pipe 23 leading to the rotary valve. With the parts in this position, the rotary valve controls the operation of the fluid pressure lock 6ª. Inasmuch as the valve controlling mechanism on the tractor is connected to the mechanism on the engine, this gives the engineer complete control of the locks on both the mechanisms.

When, however, the valve controlling mechanism on the tractor is disconnected from the mechanism on the locomotive, by moving the handle 55 upwardly, the lever 63 and the rotary valve member 62 are moved in a clockwise direction and communication between the pipe 23 leading to the rotary valve 61 and the pipe 65 leading to the lock 6ª is broken so that the movement of reversing means 8 no longer has any influence over the fluid pressure lock 6ª. In this position of the parts the pipe 65 leading to the lock is connected to the pipe 66 leading to the main source of fluid pressure supply so that the lock is furnished with motive fluid at full pressure and consequently firmly locks the valve controlling mechanism on the tractor in position. Subsequent movement of the motive fluid controlling valve by the engineer has no effect on the fluid pressure locking means for locking the valve controlling mechanism on the tractor because the connection between the controlling valve and said locking means is broken. This construction has the advantage that the valve controlling mechanism on the tractor may be disconnected in any of its positions and firmly locked therein without danger of movement until the engineer operates the clutch mechanism to connect the valve controlling mechanism on the tractor to the mechanism on the locomotive.

It is to be understood that the construction shown is for purposes of illustration only and that other structures may be devised which come within the spirit and scope of the appended claims.

What is claimed is:—

1. In combination, power operated reciprocatory valve reversing mechanism for one locomotive, reciprocatory valve reversing mechanism for a second locomotive, means for converting the reciprocatory motion of the first mechanism to rotary motion and then for converting the rotary motion to reciprocatory motion to actuate the second valve reversing mechanism, and means arranged to be mounted on the first locomotive for controlling the power operated mechanism.

2. In combination, power operated reciprocatory valve reversing mechanism for one locomotive, reciprocatory valve reversing mechanism for a second locomotive, means arranged to be mounted on the first locomotive for converting the reciprocatory motion of the reversing mechanism to rotary motion, means arranged to be mounted on the second locomotive for converting rotary motion to reciprocatory motion to reciprocate the valve reversing mechanism for the second locomotive, means for transmitting the rotary motion of the means on the first locomotive to the means on the second locomotive, said transmitting means being arranged to permit angular and reciprocatory motion between the locomotives, and means arranged to be mounted on one of the locomotives for controlling the power operated mechanism.

3. In combination, valve reversing mechanism for a locomotive, power operated means for actuating said mechanism, valve reversing mechanism for a second locomotive, means for connecting the mechanism for the second locomotive with the power operated means, means arranged to be mounted on the first locomotive for controlling the power operated means, and means also controllable from the first locomotive for disconnecting the valve reversing mechanism for the second locomotive from the power operated means.

4. In combination, power operated valve reversing mechanism for one locomotive, valve reversing mechanism for a second locomotive, means for connecting the latter mechanism with the first, means arranged to be mounted on the first locomotive for controlling the power operated mechanism, and means also arranged to be controllable from the first locomotive for disconnecting in any of its positions the valve reversing mechanism for the second locomotive from the power operated means and locking it in said position.

5. In combination, valve reversing mechanism for a locomotive, valve reversing mechanism for a tractor or auxiliary locomotive, and actuating means arranged to control the movement of both of said mechanisms simultaneously, said actuating means including disconnectible means arranged to allow for the control of the locomotive valve mechanism independently of the valve mechanism on the tractor or auxiliary locomotive.

6. In combination, valve reversing mechanism for a locomotive, valve reversing mechanism for a tractor or auxiliary locomotive, actuating means arranged to be mounted on one locomotive, and connections therefrom arranged to control the movement of both of said mechanisms simultaneously or control the movement of the locomotive valve mechanism independently of the valve mechanism on the tractor or auxiliary locomotive.

7. In combination, power operated valve reversing mechanism for a locomotive, valve reversing mechanism for a second locomotive, means for connecting the valve reversing mechanism for the second locomotive with the power operated mechanism for the first, said means being arranged so that it may be controlled from a point on one locomotive for connecting and disconnecting the two valve reversing mechanisms, and means arranged to be controlled from the same locomotive for controlling the power operated mechanism.

8. In combination, power operated valve reversing mechanism for a locomotive, valve reversing mechanism for a second locomotive, and means for connecting the valve reversing mechanism for the second locomotive with the power operated mechanism for the first, said means being arranged to be controlled from one of the locomotives so that the mechanism for the second locomotive may be disconnected from the power operated mechanism and locked in disconnected position.

9. In combination, valve reversing mechanism for a locomotive, power operated means for actuating said mechanism, valve reversing mechanism for a second locomotive, means connecting the latter mechanism with the power operated means, said connecting means being arranged to be controlled from one of the locomotives so that the valve reversing mechanism for the second locomotive may be connected and disconnected from the power operated means, and means for controlling the power operated means from the same locomotive as the connecting means.

10. In combination, power operated valve reversing mechanism for a locomotive, valve reversing mechanism for a second locomotive, means including a clutch mechanism for connecting the mechanism for the second locomotive with the power operated mechanism for the first locomotive, means arranged to be mounted on one of the locomotives for controlling said power operated mechanism, and means arranged to be controlled from the same locomotive for connecting and disconnecting the valve reversing mechanism for the second locomotive.

11. In combination, power operated valve reversing mechanism for a locomotive, valve reversing mechanism for a second locomotive, means including a clutch mechanism for connecting the mechanism for the second locomotive with the power operated mechanism for the first, said clutching mechanism being arranged to be operated from the first locomotive to disconnect the valve controlling mechanism for the second locomotive and lock it in position, and means arranged to be mounted on the first locomotive for controlling said power operated mechanism.

12. In combination, power operated valve reversing mechanism for a locomotive, valve reversing mechanism for a second locomotive, means including a clutching mechanism for connecting the valve reversing mechanism for the second locomotive with the power operated valve reversing mechanism for the first, said clutching mechanism including a gear movable into and out of engagement with other gears and arranged to be controlled from one of the locomotives for connecting and disconnecting the valve controlling mechanism on the second locomotive, and means arranged to be controlled from the same locomotive for controlling said power operated mechanism.

13. In combination, power operated valve reversing mechanism for a locomotive, valve reversing mechanism for a second locomotive, means including a clutching mechanism for connecting the valve reversing mechanism for the second locomotive with the power operated valve reversing mechanism for the first, said clutching mechanism including a gear and means for moving the same into and out of engagement with other gears, said latter means being arranged to be controlled from one of the locomotives and when operated to disconnect the gears and automatically lock the valve reversing mechanism for the second locomotive in disconnected position, and means arranged to be controlled from the same locomotive for controlling the power operated mechanism.

14. In combination, valve reversing mechanism for a locomotive, a locking means therefor, valve reversing mechanism for a tractor or auxiliary locomotive, a second locking means for the latter mechanism, and means for controlling the movement of both of said mechanisms and locking means simultaneously.

15. In combination, valve reversing mechanism for a locomotive, locking means therefor, valve reversing mechanism for a tractor or auxiliary locomotive, locking means for the latter mechanism, and means arranged to control both of said mechanisms and both of said locking means simultaneously, said means also being arranged to control the movement of the locomotive valve mechanism and both of the locking means independently of the valve mechanism on the tractor.

16. In combination, valve reversing mechanism for a locomotive, locking means therefor, valve reversing mechanism for a tractor or auxiliary locomotive, locking means for the latter mechanism, and means arranged to control both of said mechanisms and both of said locking means simultaneously, said means being also arranged to control the movement of the locomotive valve mechanism and its locking means independently of the valve mechanism for the tractor or auxiliary locomotive and its locking means.

17. In combination, valve reversing mechanism for a locomotive, fluid pressure locking means therefor, valve reversing mechanism for a tractor or auxiliary locomotive, fluid pressure locking means therefor, and means for controlling both of the valve mechanisms and both of the fluid pressure locking means simultaneously.

18. In combination, valve reversing mechanism for a locomotive, fluid pressure locking means therefor, valve reversing mechanism for a tractor or auxiliary locomotive, fluid pressure locking means for the latter mechanism, and means for controlling the movement of both of said mechanisms and both of said fluid pressure locking means simultaneously, said means being also arranged to control the movement of the locomotive valve mechanism and its fluid pressure lock independently of the valve mechanism on the tractor and its fluid pressure lock.

19. In combination, valve reversing mechanism for a locomotive, valve reversing mechanism for a tractor or auxiliary locomotive, operative connections between said reversing mechanisms to cause said mechanisms to operate in unison, means for disconnecting said connections to permit the locomotive valve reversing mechanism to be operated independently, said means being so arranged as to connect said mechanisms in the same relative relation or positions they bore to each other at the time of being disconnected.

20. In combination, valve reversing mechanism for a locomotive, valve reversing mechanisms for a tractor or auxiliary locomotive, operative connections between said reversing mechanisms to cause said mechanisms to operate in unison, means for disconnecting said connections and automatically locking the auxiliary locomotive valve reversing mechanism in disconnected position to permit the locomotive valve reversing mechanism to be operated independently, said means being arranged to connect said valve mechanisms in the same relative relation or position they bore to each other at the time of being disconnected.

21. In combination, valve reversing mechanism for a locomotive, locking means therefor, valve reversing mechanism for a tractor or auxiliary locomotive, locking means therefor, operative connections between said reversing mechanisms to cause them to operate in unison, means for disconnecting said connections and locking the auxiliary locomotive valve reversing mechanism in disconnected position, and a single means for simultaneously controlling said reversing mechanisms and both of said locking means.

22. In combination, valve reversing mechanism for a locomotive, locking means therefor, valve reversing mechanism for a tractor or auxiliary locomotive, locking means therefor, operative connections between said reversing mechanisms to cause them to operate in unison, means for disconnecting said connections and causing the locking means for the auxiliary locomotive mechanism to lock said mechanism in whatever position it may occupy when disconnected, said connecting and disconnecting means being so arranged as to cause the valve mechanisms to be connected together in the same relative positions that they bore to each other at the time of being disconnected.

23. In combination, fluid pressure operated valve mechanism for a locomotive, valve reversing mechanism for a second locomotive, connections to said fluid pressure operated mechanism arranged to allow relative angular and reciprocatory motion between the locomotives without affecting the transfer of power between said mechanisms, and means arranged to be mounted on one of the locomotives for controlling the motive fluid supply to the fluid pressure operated mechanism.

24. In combination, fluid pressure operated valve reversing mechanism for a locomotive, valve reversing mechanism for a second locomotive, mechanical connections therefrom to said fluid pressure operated mechanism arranged to allow angular and reciprocatory motion between the locomotives without affecting the transfer of motion between the mechanisms, and means arranged to be mounted on one of the locomotives for controlling the motive fluid supply to the fluid pressure operated mechanism.

25. In combination, power operated valve reversing mechanism for a locomotive, a fluid pressure lock for locking the valve reversing mechanism in various positions, valve reversing mechanism for a second locomotive connected to the power operated mechanism for the first, a fluid pressure lock for locking the mechanism for the second locomotive in various positions, and means arranged to be mounted on one of the locomotives for controlling the power operated mechanism and the fluid pressure supply to both of the locking means.

26. In combination, valve reversing mechanism for a locomotive, fluid pressure actuated means for actuating said mechanism, a fluid pressure lock for locking the valve reversing mechanism, in various positions, valve reversing mechanism for a second locomotive connected to the power operated means, a fluid pressure lock for locking the valve reversing mechanism for the second locomotive in various positions, and means arranged to be mounted on one of the locomotives for controlling the motive fluid supply to the power operated means and to both of the locking means.

27. In combination, fluid pressure operated valve reversing mechanism for a locomotive, a fluid pressure lock for locking the valve reversing mechanism in various positions, valve reversing mechanism for a second locomotive mechanically connected to the fluid pressure operated mechanism for the first, a fluid pressure lock for locking the mechanism for the second locomotive in various positions, and means arranged to be mounted on one of the locomotives for controlling the motive fluid supply to the fluid pressure operated mechanism and to both of the locking means.

28. In combination, fluid pressure operated valve reversing mechanism for a locomotive, a fluid pressure lock for locking the valve reversing mechanism in various positions, valve reversing mechanism for a second locomotive connected to the fluid operated mechanism for the first, a fluid pressure lock for locking the mechanism for the second locomotive, and means arranged to be mounted on one of the locomotives and to be moved in opposite directions to cause the fluid pressure operated valve reversing mechanism to move in opposite directions, said means when moved exhausting motive fluid from the locking means and admitting motive fluid to the fluid pressure operated mechanism to thereby first unlock both valve reversing mechanisms and then actuate them.

29. In combination, fluid pressure operated valve reversing mechanism for a locomotive, a fluid pressure lock for locking the valve reversing mechanism in various positions, valve reversing mechanism for a second locomotive connected to the fluid pressure mechanism for the first, a fluid pressure lock for locking the valve reversing mechanism on the second locomotive, both of said fluid pressure locking means being arranged to firmly lock the mechanisms in position but permitting movement thereof under abnormal conditions, and means arranged to be mounted on one of the locomotives for controlling the fluid pressure operated mechanism, said means when moved exhausting motive fluid from both of the locking means and admitting motive fluid to the fluid pressure operating mechanism to thereby unlock both mechanisms and actuate them.

30. In combination, fluid pressure operated valve reversing mechanism for a locomotive, a fluid pressure lock for locking the valve reversing mechanism in various positions, valve controlling mechanism for a second locomotive connected to the fluid pressure operated mechanism for the first, a fluid pressure lock for locking the valve controlling mechanism for the second locomotive, means arranged to be mounted on the first locomotive and when moved from neutral position to exhaust motive fluid from both of the locking means and admit motive fluid to the fluid pressure operated mechanism to thereby unlock both mechanisms and actuate them, and means connecting the valve controlling mechanism on one locomotive with the means for controlling the motive fluid supply to automatically actuate the motive fluid controlling means to cause motive fluid to be exhausted from the power operated means and admit motive fluid to both of the locking means when the valve mechanisms have moved to the desired extent.

31. In combination, fluid pressure actuated valve reversing mechanism for a locomotive, a fluid pressure lock for locking the valve reversing mechanism in various positions, valve reversing mechanism for a second locomotive connected to the fluid pressure operated mechanism for the first, a fluid pressure lock for locking the valve controlling mechanism for the second locomotive, motive fluid controlling means arranged to be mounted on the first locomotive and to be moved in either direction and when moved to exhaust motive fluid from both locking means and admit motive fluid to the fluid pressure operated mechanism to thereby unlock both mechanisms and actuate them in one direction, and connecting means between the valve controlling mechanism for the first locomotive and the motive fluid controlling means for moving said latter means bodily to thereby actuate the same to cause motive fluid to be exhausted from the fluid pressure operated mechanism and admitted to both of the locking means when the valve mechanism has moved to the desired extent.

32. In combination, valve reversing mechanism for one locomotive, fluid pressure operated means for actuating the same, valve reversing mechanism for a second locomotive connected by flexible and slidable connections to the power operated means, a fluid pressure lock for each of said valve reversing mechanisms, means arranged to be mounted on one locomotive which when moved from neutral position exhausts motive fluid from both the locking means and admits motive fluid to the fluid pressure operated means to operate it in one direction, and means connecting the valve reversing mechanism for the first locomotive with the motive fluid controlling means to automatically actuate said motive fluid controlling means to exhaust motive fluid from the fluid pressure operated mechanism and admit motive fluid to both the locking means when the valve reversing mechanisms have traveled to the desired extent.

33. In valve reversing mechanism, a reciprocatory valve-operating rod adapted to operate the valve mechanism of a locomotive, a fluid pressure motor for operating said rod, a second reciprocatory valve operating rod adapted to operate the valve mechanism of a second locomotive, means for connecting the second rod with the fluid pressure operated means so that the reciprocatory motion of the fluid pressure motor is transferred to rotary motion and then to reciprocatory motion to operate the second rod, and means arranged to be mounted on one of the locomotives for controlling the fluid pressure operated means.

34. In valve reversing mechanism, a valve reversing rod, a fluid motor for operating said rod, fluid pressure locking means for locking said rod, a second rod adapted to operate the valve mechanism of a second locomotive, means connecting the second rod and the fluid pressure operating means, a fluid pressure locking means for locking the second rod, motive fluid controlling valve mechanism for controlling the supply of motive fluid to the motor and both of the locking means, said motive fluid controlling mechanism being arranged so that when moved from neutral position it exhausts motive fluid from both of the locking means and admits motive fluid to the motor to operate it to actuate the valve reversing rods.

35. In valve reversing mechanism, a valve operating rod adapted to operate the valve mechanism of a locomotive, a fluid pressure motor for operating said rod, a second valve operating rod adapted to operate the valve mechanism of a second locomotive, means for connecting the second rod with the fluid pressure operated means, said means being arranged to be controlled from a distant point on one locomotive so that the valve operating rod on the second locomotive may be connected and disconnected from the fluid motor, and means arranged to be controlled from the same locomotive for controlling the motive fluid supply to the fluid motor.

36. In valve reversing mechanism, a valve operating rod adapted to operate the valve mechanism of a locomotive, a fluid pressure motor for operating said rod, a fluid pressure locking means for locking said rod in various positions, a second valve operating rod adapted to operate the valve mechanism of a second locomotive, a fluid pressure locking means for locking the second rod in various positions, connecting means for connecting the second rod with the fluid pressure motor, motive fluid controlling means arranged to be mounted on one locomotive for controlling the motive fluid supply to the fluid motor and to both of the locking means, and means controllable from the same point as the motive fluid controlling means for actuating said connecting means to disconnect the valve operating rod for the second locomotive from the fluid motor, said means when operated automatically removing the control of the fluid pressure locking means for the second rod from the motive fluid controlling means so that said motive fluid controlling means and the first rod may be moved independently of the second rod which is disconnected and locked in position.

37. In valve reversing mechanism, a fluid pressure cylinder having a piston therein connected to a valve operating rod for operating the valve mechanism of a locomotive, a second valve operating rod adapted to operate the valve mechanism of a second locomotive, a rod attached to the side of the piston opposite that to which the first rod is connected and carrying a rack, gearing for transferring the reciprocatory motion of said rack to rotary motion, a universal joint and telescopic connecting means for transferring the rotary motion of said gearing to rotary motion of a similar gearing arranged to be mounted on the second locomotive, said second gearing coöperating with a rack on the second rod for transferring its rotary motion to reciprocatory motion of the rod, and means arranged to be mounted on the first locomotive for controlling the admission and exhaust of motive fluid from the opposite ends of the fluid pressure cylinder to thereby control the movement of the piston and of the two valve mechanisms.

38. In combination, fluid pressure operated valve reversing mechanism for a locomotive, a fluid pressure lock for locking said mechanism in various positions, a valve reversing mechanism for a second locomotive, a fluid pressure lock for locking the valve reversing mechanism for the second locomotive in various positions, connecting means for connecting the valve reversing mechanisms, means arranged to be mounted on one of the locomotives for controlling the fluid pressure supply to the fluid pressure operating valve reversing mechanism and both of the fluid pressure locking means, and means by which the valve reversing mechanism on the second locomotive may be disconnected from that on the first, said means, when operated, automatically removing the control of the fluid pressure lock for the valve reversing mechanism for the second locomotive from the motive fluid controlling means, whereby the valve reversing mechanism for the second locomotive is disconnected from the first and locked in position by the fluid pressure lock, so that it is independent of subsequent operation of the valve reversing mechanism for the first locomotive until the connecting means has again been operated to connect the valve reversing mechanisms.

39. In combination, fluid pressure operated valve reversing mechanism for a locomotive, fluid pressure locking means therefor, valve reversing mechanism for a tractor or auxiliary locomotive, fluid pressure locking means for the latter mechanism, operative connections between said reversing mechanisms to cause them to operate in unison, means for disconnecting said connections in any position of the valve mechanisms and applying said fluid pressure locking means to the auxiliary locomotive valve mechanism to lock said mechanism in disconnected position, said connecting and disconnecting means being so arranged as to connect said valve mechanisms in the same relative relation or positions they bore to each other at the time of being disconnected.

40. In combination, valve reversing mechanism for a locomotive, valve reversing mechanism for a tractor or auxiliary locomotive, means for controlling the movement of both of said mechanisms simultaneously, and means for locking both of said mechanisms so that the usual operating strains from the locomotive valve mechanisms and link motions will be arrested before reaching the mechanical elements of the mechanisms.

41. In combination, valve reversing mechanism for a locomotive valve reversing mechanism for a tractor or auxiliary locomotive, means for controlling the movement of both of said mechanisms, and friction locking means for locking the said mechanisms so that the operating strains from the locomotive valve mechanisms and link motions will be arrested before reaching the mechanical elements of the reversing mechanisms.

42. In combination, valve reversing mechanism for a locomotive, valve reversing mechanism for a tractor or auxiliary locomotive, means for controlling the movement of both of said mechanisms, and fluid pressure applied friction locking means for locking the said mechanisms so that the operating strains from the locomotive valve mechanisms and link motions will be arrested before reaching the mechanical elements of the reversing mechanisms.

In testimony whereof, I have hereunto set my hand.

JACOB RUSH SNYDER.

Witnesses:
  G. H. ZERESCHE,
  A. E. JOHNSON.